United States Patent [19]

Morley

[11] Patent Number: 4,495,980

[45] Date of Patent: Jan. 29, 1985

[54] BINDERS FOR FOUNDRY CORES AND MOULDS

[75] Inventor: John G. Morley, Kings Coughton, England

[73] Assignee: BCIRA, Birmingham, England

[21] Appl. No.: 433,231

[22] Filed: Oct. 7, 1982

[30] Foreign Application Priority Data

Oct. 10, 1981 [GB] United Kingdom ................. 8130649
Apr. 28, 1982 [GB] United Kingdom ................. 8212339

[51] Int. Cl.$^3$ ................................................ B22C 9/12
[52] U.S. Cl. ...................................... 164/16; 164/525; 164/528; 106/38.2
[58] Field of Search .................... 164/12, 16, 525, 528; 106/38.2; 523/139

[56] References Cited

U.S. PATENT DOCUMENTS 4,269,256  5/1981  Nakazawa ........................... 106/38.2

FOREIGN PATENT DOCUMENTS 53-68619   6/1978  Japan ................................. 164/525
54-132427 10/1979  Japan ................................. 164/525
55-103253  8/1980  Japan ................................. 164/16
57-62833   4/1982  Japan ................................. 164/16

Primary Examiner—Kuang Y. Lin
Assistant Examiner—Richard K. Seidel
Attorney, Agent, or Firm—Scrivener, Clarke, Scrivener and Johnson

[57] ABSTRACT

A binder for a foundry mould or core comprises an alkali metal salt of a polyvalent organic acid or a polymerized monovalent organic acid, for example sodium polyacrylate, and an alkaline earth hydroxide such as calcium hydroxide, together with a suitable solvent. Up to 80% of the calcium hydroxide may be replaced by a polyvalent metal oxide or hydroxide. The mixture may include small proportions of other materials, such as aluminum sulphate. It is important that the pH of the organic acid salt solution before mixing with the alkaline earth hydroxide should not be too high and it should preferably be between 5 and 8, in particular between 5.7 and 6.6.

11 Claims, No Drawings

BINDERS FOR FOUNDRY CORES AND MOULDS

SPECIFIC DESCRIPTION

Various processes are at present in use for binding together the grains of refractory material (generally sand) used to form foundry cores and, less often, moulds. Some binders set of their own accord after a period of time in the presence of a catalyst. There are also binders which are hardened by passing through the refractory mixture on appropriate reactive gas, such as carbon dioxide, sulphur dioxide or more complex gases based on amines. Some of the latter gases are extremely unpleasant to handle, requiring extensive ventilation of the core-making plant, and are even toxic.

By far the most satisfactory gas to use is carbon dioxide, being non-toxic and reasonably cheap. It is used chiefly to cure a binder in the form of sodium silicate and acts by reacting with the sodium silicate to form sodium carbonate and releasing silica as a hydrogel which forms a bond between the sand grains. Sodium silicate is itself attractive as it is cheap and does not depend upon organic materials originating from petrochemicals. On the other hand the bond which it forms is not as strong as that which can be obtained by the use of the more complex organic resin binders based on phenol formaldehyde or furan resins. Moreover sodium silicate can produce problems in the removal of the core material from the castings after manufacture, because it fuses with the sand grains at high temperatures to produce a relatively hard glass.

Most other known gas-hardening processes use organic binders hardened by passing through them gases which are toxic or at least far from pleasant to handle.

There is therefore a strong need for an improved gas hardening process which uses a cheap and easily handled gas such as carbon dioxide and involves no heat or long curing times, and which results in cores which simultaneously are as strong to handle during placing and casting as silicate-bonded cores but break down into a friable easily removable mass after casting.

In a recently published British Patent Application No. 2 037 787 it is suggested that a binder capable of cold setting by the action of carbon dioxide gas could be made up of an alcohol-soluble phenolic resin, a polyvalent metal hydroxide (such as calcium hydroxide) and/or oxide, an organic solvent (such as alcohol or acetone) and an alkali metal hydroxide (e.g. sodium hydroxide), with some water. The specially developed phenolic resins are used to produce insoluble phenolic resin compounds which form the principal binder. A wide range of possible starting materials is suggested, and the resins could be based on resols, novolaks, resorcinol or high phenols such as cresol or butylphenol.

In a U.S. Pat. No. 4,269,256 of the same proprietors it is acknowledged that it has already been proposed to blow carbon dioxide gas into a moulding material containing a binder comprising a combination of an acrylic copolymer and calcium hydroxide. The copolymer suggested is of an acrylic acid ester with ammonium acrylate and sodium acrylate. It has the drawback that the core or mould takes time to develop its strength following gassing; moreover ammonia is liberated and pollutes the surroundings. The novel process proposed in the above-mentioned U.S. Patent Specification, involves the use of a copolymer, selected from a quoted range of such materials, neutralized with an alkali, together with calcium hydroxide. The copolymers suggested are those of maleic anhydride with either an alpha-olefin or styrene or methyl vinyl ether. The possibility of adding polyvinyl alcohol, calcium oxide and certain other metal hydroxides is mentioned.

The purpose of the alkali is to make the copolymer soluble in water by reacting with the carboxyl group or groups in the copolymer to produce a soluble metal salt, e.g. a sodium or potassium salt of the carboxylic acid in the copolymer.

In the German published application No. 28 14 357 corresponding partially to the above-mentioned U.S. application, the possibility is mentioned of using not necessarily a copolymer but simply a homopolymer containing carboxylic groups, together with a polyvalent metal hydroxide and a polyvinyl alcohol resin. It is stated that if the homopolymer is soluble in water there is no need to add the alkali.

Finally, in British Patent Specification No. 1 568 600 there is disclosed a carbon dioxide process in which the binder is prepared from an aqueous solution of a sodium salt of a carboxylic acid copolymer, such as a copolymer of styrene and maleic acid.

The known processes described above are not easy to carry out in practice, and it is believed that they are sensitive to factors not fully specified in the disclosures in question; furthermore the ranges of possible materials do not discriminate between those which are effective and those which are not.

In particular, in the U.S. Pat. No. 4,269,256 various binary and ternary copolymers based on esters and organic acid salts are mentioned as prior art but are stated to have defects. Products of the reaction of sparingly soluble or insoluble polymers with a caustic alkali are suggested, but these will be hydrolysed esters, not salts.

There is therefore still room for a method of forming a foundry mould or core which uses clearly specified commercially available materials under specified operating conditions, to obtain reliably and repeatedly the desired result, namely a foundry core or mould gassed with carbon dioxide (or another acid gas) and which is strong to handle (and acquires its strength quickly) yet will disintegrate easily after casting.

According to the invention we propose that this should be achieved by a method of forming a foundry mould or core comprising adding to a body of sand or similar refractory particles a binder comprising an alkali metal salt of a polyvalent organic acid or of a polymerised monovalent organic acid, together with an alkaline earth hydroxide and a suitable solvent, and passing an acid gas through the resulting body.

Such a composition may be gassed with sulphur dioxide or carbon dioxide, but preferably the latter, for the general reasons given earlier. The alkali metal salt is, again for reasons of availability and cost, preferably the sodium salt, and is formed by reacting the acid (or an anhydride or ester of it) with sodium hydroxide. Furthermore it is proposed, according to an important subsidiary feature of the invention, that this should be done with quantities such as to produce a solution having a pH of not less than 5 and not more than 8 and preferably between 5.7 and 6.6. It is believed that it has not hitherto been appreciated that the pH of the alkali metal salt of the carboxylic acid is important if successful results are to be obtained. In particular the solution should not contain residual sodium hydroxide such as to make it significantly alkaline, even though it is later to be mixed with an alkaline earth hydroxide, e.g. calcium hydroxide, that will do so.

The preferred alkali metal salt is sodium polyacrylate. It is not easily available in solid form but may be produced or obtained as an aqueous solution. Instead of being prepared beforehand it could be produced in situ by adding its various constituents in aqueous solution and allowing them to react together during mixing. Instead of reacting the polymerised acid with sodium hydroxide, an alternative possibility would be to make the sodium acrylate monomer and then polymerise it. The organic material should preferably be such as to have a high molecular weight, if possible with an average value greater than 50,000.

The binder components react with the gas in the presence of a liquid, which can conveniently be the solvent or carrier for the organic constituent; preferably this should be a polar liquid, (water is the easiest to use) and its presence assists in the reactions which take place in gassing. The gassing is carried out in a matter of seconds by injecting the carbon dioxide into the mould or core box using techniques well-known in the industry.

The binder mixture may be intimately mixed with the sand or other refractory material to form a flowable mass that can be poured into the mould or corebox.

Part of the alkaline earth hydroxide may be replaced by one or more polyvalent metal oxides and/or other polyvalent metal hydroxides.

The relative proportions of the constituents can vary over quite a wide range. Preferably the total weight of alkaline earth hydroxide and metal oxide (where present) is between 25 and 400 percent of the weight of the organic acid salt, and the metal oxide can form between 0 and 80 percent of the non-organic constituent. It is also of advantage, though not essential, to combine with the oxide or the mixture of oxides a small amount (say up to 10 percent) of a salt of a polyvalent metal, for example aluminum sulphate.

In a typical example the sand mixture may contain between 0.2 and 6 percent by weight of the organic constituent, i.e. the alkali metal salt, added as a 10 to 70 percent solution in a liquid carrier. To this is added, in an amount from one quarter to four times the weight of the organic constituent, a mixture containing from 20 to 100 percent of alkaline earth hydroxide (e.g. calcium hydroxide) with the balance consisting of a polyvalent metal oxide or oxides, with up to 10 percent of an addition of other ionic salts of polyvalent metals.

The amount of liquid present in the sand mixture should be between 0.5 and 5 percent (by weight) of a polar liquid, which may be added either as a carrier for the organic salt or by any other means.

The organic constituent is preferably present within the range of 0.5 to 1.5 percent of the total weight of the sand mixture, and the inorganic constituent within the range 0.5 to 2 percent. There may be between 1.5 and 4 percent water, and the weight of carbon dioxide used in gassing is between 0.3 and 2 percent of the total weight.

As will be apparent from the test results set out below, the resulting cores and moulds have a good strength but, after casting, are easy to remove from the cold casting. They also have the advantage that they may be removed either by vibration or by washing with water under relatively low pressure. They are easy to remove from aluminium castings as well as from castings made from metals of higher melting point.

Where the organic constituent is a salt of a polymerised monobasic acid, rather than of a polybasic acid, it will be understood that the polymer molecule must have a number of free carboxylic acid groups.

The action of the curing gas is to disturb the chemical equilibrium of the mixture of organic and inorganic constituents in such a way as to yield an insoluble polyvalent metal salt of the acid gas and a polymer cement formed from the polybasic (or polymerised monobasic) acid and the polyvalent metal, which act together as the sand binder system.

The preferred material, sodium polyacrylate, is believed to be much more effective than the alkali salts of other polybasic or polymerised monobasic acids because, when the carbon dioxide gas reacts with some of the sodium ions of the salt, sodium carbonate is produced and the increase in the ionic strength of the binder mixture results in the precipitation of the polyacrylate as a gel. The action of this gel as a bonding agent increases the "as-gassed" strength of the sand, compared with binders based on alkali metal salts of other polybasic or polymerised acids. Reactions between the calcium ions in the binder and the polyacrylic acid result in a further build-up of strength over a twenty-four hour period.

Salts of ther materials investigated are apparently not precipitated as readily or as completely as sodium polyacrylate; however it is possible that salts of closely related materials, such as polymethacrylic acid or of mixtures of these with polyacrylic acid, will behave in the same way.

The invention will now be further described with reference to a number of examples of compositions and the results of test carried out on the compositions, as well as tests showing the importance of ensuring a correct pH value of the sodium polyacrylate.

In the tests of which the results are set out below, a Chelford 60 silica sand was used throughout, and the organic constituent was a solution of sodium polyacrylate prepared by adding sodium hydroxide solution to the polyacrylic acid. The theoretical amount required to neutralise the acid was added as a 20 percent solution in water. Except where stated, a 25 percent aqueous solution of the polyacrylic acid was used, and its average molecular weight was 230,000.

A stock solution was prepared with the following composition:

| Polyacrylic acid (25% solution) | 600 gm |
| Sodium hydroxide | 83.4 gm |
| Water | 400 gm |

The inorganic constituent was calcium hydroxide throughout, with additions of commercially available finely divided powders such as magnesium oxide, magnesium hydroxide, zinc oxide, Fondue cement, iron III salts, and aluminium salts.

SAND PREPARATION AND TEST METHODS

Sand mixtures were prepared by mixing the appropriate amount of the polyacrylate solution with the sand for one minute. The inorganic components were the added and mixing continued for a further period of 1 minute.

The mixed sand was contained in sealed containers prior to use.

Standard 5 cm×5 cm AFS compression test pieces were prepared and were hardened by gassing with carbon dioxide at flow rates ranging from 2.5 liters/min to 10 liters/min for gassing times of 1 to 60 seconds.

After gassing, specimens were used for strength testing, some being used immediately, the compression strength measured being recorded as the "as gassed" strength; others were stored for periods up to 1 week, compression strengths being determined at appropriate intervals within that time.

The breakdown of the sand after casting was assessed by making test castings in which 5cm×5 cm AFS compression test piece specimens had been used as cores.

The test casting used was a finning test block weighing 25 kg with dimensions of 254 mm×176 mm×78 mm. Six cores were placed in each casting, for which greensand moulds were used.

The castings were made of a grey iron, poured at 1400° C. When cool, the castings were carefully removed from the mould.

The extent of core breakdown was assessed using the BCIRA impact penetration tester (at 31.75 Kg load), which essentially measures the resistance of the sand to the impact of a sharp pointed probe. The number of impacts required to penetrate each centimeter depth of the core sand remaining in the casting were recorded as a measure of the breakdown. Low values indicate good breakdown, high values show poor breakdown.

TEST RESULTS

EXAMPLE 1

A sand mixture was prepared containing:

| Chelford 60 sand | 1.5 kg |
|---|---|
| Sodium polyacrylate solution | 54 gm |
| Calcium hydroxide | 20 gm |

The mixed sand was flowable, compacted well on ramming and had a bench life exceeding 3 hours.

The compression strength results on cores prepared from this mixture are shown in Table 1. For comparison, Table 2 shows results obtained for $CO_2$-silicate process cores under similar conditions.

These results show that with the new binder, cores can be produced with good handling strengths in a very short gassing time. The "as gassed" strength of 180 $lb/in^2$ is comparable with that for a normal foundry sodium silicate binder, but the equivalent gassing time for the silicate would have been in excess of 30 seconds—see Table 2.

On storage, the cores continue to harden achieving very high strengths in 24 hours, generally better than $CO_2$-silicate cores and comparable with strengths achieved from most cold setting resin binder processes currently used for coremaking.

TABLE 1

COMPRESSION STRENGTHS FOR THE NEW BINDER

| Time | Gassing time secs | $CO_2$ gas flow rate liters/min | Compression strength $lb/in^2$ | $kN/m^2$ |
|---|---|---|---|---|
| As gassed | 10 | 2.5 | 180 | 1241 |
| As gassed | 1 | 10 | 70 | 483 |
| 1 hour | 10 | 2.5 | 207 | 1427 |
| 4 hours | 10 | 2.5 | 368 | 2537 |
| 24 hours | 1 | 10 | 844 | 5819 |
| 24 hours | 10 | 2.5 | 809 | 5578 |

| Time | Gassing time | Gas flow rate | Tensile strength $lb/in^2$ | $kN/m^2$ |
|---|---|---|---|---|
| 24 hours | 10 | 2.5 | 114 | 786 |

(Specimens stored at 22° C. and 60 percent relative humidity)

TABLE 2

$CO_2$-SILICATE COMPRESSION STRENGTHS

| Time | Gassing time secs | Gas flow rate liters/min | Compression strength $lb/in^2$ | $kN/m^2$ |
|---|---|---|---|---|
| As gassed | 20 | 2.5 | 46 | 317 |
|  | 40 | 2.5 | 124 | 855 |
|  | 60 | 2.5 | 178 | 1227 |
| 24 hours | 20 | 2.5 | 846 | 5833 |
|  | 40 | 2.5 | 377 | 2599 |
|  | 60 | 2.5 | 237 | 1634 |

(Sand mixture contained 3.5% of a 2.3:1 ratio sodium silicate)
(Specimens stored at 24° C. 34 percent R.H.)

EXAMPLE 2

Shows use of mixed powder additions.
The following sand mixture was made:

| Chelford 60 sand | 1.5 kg | |
|---|---|---|
| Sodium polyacrylate solution | 54 gm | |
| Calcium hydroxide | 10 gm | } added together |
| magnesium oxide | 10 gm | |

The resulting mixture was free flowing, had a drier consistency than that for Example 1, gave very well compacted cores and had a long bench life (more than 4 hours).

Cores produced from this mixture had excellent surface finish, very strong with good edges and a 'smooth' skin.

Compression strength results are shown in Table 3.

TABLE 3

COMPRESSION STRENGTHS FOR NEW BINDER - Example 2

| Time | Gassing time secs | Compression strengths $lb/in^2$ | $kN/m^2$ |
|---|---|---|---|
| As gassed | 10 | 84 | 579 |
| 3 hours | 10 | 278 | 1917 |
| 24 hours | 10 | 859 | 5923 |

(Cores all gassed with $CO_2$ at 2.5 liters/min.)
(Specimens stored at 23° C., 60 percent R.H.)

EXAMPLES 3-10

See Table 4.

The effect on compression strengths of the composition of the sand mixture can be seen in Table 4. The most effective compositions have relatively high calcium hydroxide contents with a small addition of magnesium oxide and Fondue cement or zinc oxide.

TABLE 4

EFFECT OF MIX COMPOSITION ON COMPRESSION STRENGTH (including Examples 1-2)

Composition (sand weight 1.5 kg)

| Example | Sodium polyacrylate solution gms | Powder components | | | | Compression strengths lb/in² (kN/m²) | | | | | |
|---|---|---|---|---|---|---|---|---|---|---|---|
| | | Ca(OH)₂ | MgO | Cement Fondue | ZnO | As gassed | | 1 hour | | 24 hours | |
| 1 | 54 | 20 | — | — | — | 180 | (1241) | 207 | (1427) | 809 | (5578) |
| 2 | 54 | — | 20 | — | — | 0 | (0) | — | | — | |
| 3 | 54 | 10 | 10 | — | — | 84 | (579) | — | | 859 | (5923) |
| 4 | 54 | 15 | — | 5 | — | 146 | (1007) | 179 | (1234) | 587 | (4047) |
| 5 | 54 | 15 | 3 | 2 | — | 71 | (490) | 148 | (1020) | 988 | (6812) |
| 6 | 40.5 | 15 | 5 | — | — | 26 | (179) | 117 | (807) | 630 | (4344) |
| 7 | 81 | 20 | 10 | — | — | 25 | (172) | 41 | (283) | 637 | (4392) |
| 8 | 54 | 22.5 | 5 | 5 | — | 82 | (565) | 147 | (1014) | 873 | (6019) |
| 9 | 54 | 10 | 5 | — | 10 | 106 | (731) | 197 | (1358) | 1002 | (6908) |
| 10 | 66 | 10 | — | — | 10 | 53 | (365) | 102 | (703) | 1159 | (7991) |

(All specimens gassed for 10 seconds at 2.5 liters CO₂/minute)

EXAMPLE 11

Core Breakdown Tests

A sand mixture was prepared containing

| | |
|---|---|
| Chelford 60 sand | 1.5 kg |
| Sodium polyacrylate solution | 54 gm |
| Calcium hydroxide | 15 gm |
| Magnesium oxide | 5 gm |

5 cm×5 cm AFS compression test pieces were prepared from the mixture and gassed with $CO_2$ for 10 seconds at 2.5 liters/min.

Six of the specimens were subjected to a core breakdown test as described earlier.

The results are shown in Table 5 with comparable results for $CO_2$-silicate cores, and $CO_2$-silicate cores with a special breakdown additive.

TABLE 5
RESULTS OF BREAKDOWN TESTS

| Core Type | No. of impacts per cm penetration | | | | Average/cm |
|---|---|---|---|---|---|
| | 1st | 2nd | 3rd | 4th | |
| New binder | 0 | 0 | 0 | 1 | 0.25 |
| CO₂-silicate (3.5% C112) | 12 | 20 | 20 | no result | 17.3 |
| CO₂-silicate (3.5% C112 + breakdown additive) | 1 | 3 | 9 | no result | 3.3 |

Clearly, this new binder has excellent breakdown properties for iron casting.

EXAMPLE 12

A similar exercise was carried out for an *aluminium casting* and the breakdown was also found to be good. The test casting and method of knock-out differed from that used for the iron casting but a comparative trial was carried out using cores bonded with the new binder materials and cores bonded with $CO_2$-silicate binder.

The results were as follows:

| Binder type | No. of impacts to remove core completely |
|---|---|
| CO₂-polyacrylate (according to Example 12) | 5 |
| CO₂-silicate | 40 |

-continued

| Binder type | No. of impacts to remove core completely |
|---|---|
| (3% C112) | |

EXAMPLE 13

To produce a good surface finish on castings, free from any defects, it is frequently necessary to apply a special refractory coating to cores prior to setting them in the mould. Such coatings may be water based and require oven drying or they may be spirit based, excess spirit being burned away following coating.

Water based coatings and spirit based coatings have been applied to cores produced from this new binder material and satisfactory results obtained. The cores were not damaged by the coating, drying or flame-off procedures necessary to produce a good even coating.

Coated cores have been used satisfactorily in the production of a number of different test castings producing excellent surface finish.

EXAMPLE 14

It is known that additions of certain silane compounds (e.g. gamma-aminopropyltriethoxysilane) to sand mixtures containing organic resin binders can have a beneficial effect on the strength properties of the bonded sand. Such silane modification can be made to this binder system with good effect and tensile strengths can be improved substantially.

Silane modifications may be accomplished either by treating the compounds before their admixture with the sand or by making a separate addition of the silane compound directly to the sand mixture during preparation.

Effect of pH on Binder Properties

The following tests illustrate the importance of achieving the correct pH. In each case 1.5 Kg of Chelford sand was mixed with 20 g of calcium hydroxide and with a quantity of sodium polyacrylate solution made up from each of the range of mixtures in turn listed in the following Table 5. It will be seen that the pH ranged from just over 4 up to 13.0. In each case the sodium polyacrylate solution was mixed with the sand for one minute, then the calcium hydroxide was added and mixing was continued for a further one minute period. The polyacrylic acid used in making the sodium polyacrylate was a 25% solution in water with an average molecular weight of 230,000.

TABLE 5

COMPOSITION OF SODIUM POLYACRYLATE SOLUTIONS

| Polyacrylic Acid g | Sodium Hydroxide g | Water g | Total Weight of Solution g | pH of Solution (Binder component) |
|---|---|---|---|---|
| 30 | 1.5 | 20 | 51.5 | 4.70 |
| 30 | 2 | 20 | 52 | 4.93 |
| 30 | 2.5 | 20 | 52.5 | 5.45 |
| 30 | 3 | 20 | 53 | 5.70 |
| 30 | 3.5 | 20 | 53.5 | 6.08 |
| 30 | 3.8 | 20 | 53.8 | 6.28 |
| 30 | 4 | 20 | 54 | 6.56 |
| 30 | 4.2 | 20 | 54.2 | 6.81 |
| 30 | 4.5 | 20 | 54.5 | 8.04 |
| 30 | 5 | 20 | 55 | 12.36 |
| 30 | 5.5 | 20 | 55.5 | 13.00 |

5 cm×5 cm standard AFS compression test pieces were prepared and these were hardened by carbon dioxide gas, at a flow rate of 2.5 liters/min, for a 10 second gassing period. The compression strengths of the cores were determined immediately after stripping from the core tube ("as gassed") and then 1 hour, 4 hours and 24 hours after preparation of the test pieces, which were stored at a temperature of 22°–24° C. and a humidity of 50–60 percent. After 24 hours, an indirect tensile test was also carried out, in which a 5 cm×5 cm AFS compression test piece was placed with its cylindrical section between the jaws of the test machine and a compressive load was applied across its diameter. The specimen broke along the line of the loaded diameter, and the load required to achieve the fracture was divided by 4, to convert the value to an indirect tensile strength in lb/in$^2$. This test is described in a report by F. Hofmann in Giesserei 1963 (v. 50, pp. 815–822).

The results, listed in the following Table 2, showed that the properties of the bonded sands were affected by the pH of the sodium polyacrylate solution. The bench life of sands with pH below 6 were relatively short and not ideally suited for use in applications where gas hardened binders are normally used. At all pH above 6 bench lives exceeding 2 hours were obtained.

TABLE 6

BENCH LIFE OF MIXTURES, COMPRESSION STRENGTHS AND INDIRECT TENSILE STRENGTHS OF SPECIMENS PREPARED FROM THE TEST MIXTURES

| pH of Binder Component | Bench Life | Compression Strength lb/in$^2$ As gassed | Compression Strength lb/in$^2$ 1 hour | Compression Strength lb/in$^2$ 24 hours | Indirect Tensile Strength, lb/in$^2$ 24 hours |
|---|---|---|---|---|---|
| 4.70 | <2 min | 124 | 91 | 169 | 30 |
| 4.93 | 2–4 min | 127 | 143 | 351 | 35 |
| 5.45 | 7 min | 121 | 216 | 615 | 72 |
| 5.70 | 20 min | 128 | 196 | 880 | 101 |
| 6.08 | >2 hours | 145 | 197 | 787 | 104 |
| 6.28 | >2 hours | 134 | 194 | 902 | 155 |
| 6.56 | >2 hours | 138 | 170 | 852 | 116 |
| 6.81 | >2 hours | 73 | 156 | 966 | 159 |
| 8.04 | >2 hours | 64 | 125 | 1088 | 190 |
| 12.36 | >2 hours | 31 | 105 | 1016 | 174 |
| 13.00 | >2 hours | 4 | 22 | 773 | 107 |

Compression strength results showed that for high "as gassed" strengths a pH of 5.7–6.6 was desirable and for this pH range the strengths achieved at 1 hour and 24 hours were also very good. At pH values above 6.6 a steady decline was observed in the rate of gas hardening until in very alkaline conditions the specimens were not strong enough to be handled after gassing and even after periods of 1 hour were still comparatively weak. However, the 24 hour compression strengths for sands in the pH range 6.8–12.5 (approx.) were very high.

The surprising conclusion is, therefore, that the best range of bonded sand properties is achieved with this binder system only if the pH at the initial stage (the formation of the first binder component) is less than 6.6 and preferably greater than 5.7, i.e. slightly acid, and that the fact that the subsequent addition of the alkaline earth hydroxide makes the mixture much more alkaline later does not affect this.

Although on present information the preferred carboxylic acid is polyacrylic acid, other acids are possible, but it is believed that less satisfactory results are obtained if the acid is a strong one to start with, and for this reason tartaric acid, although capable of giving results, is less acceptable than acrylic acid. Maleic acid and anhydride are too strong. In practice the starting material should have a pK of not less than 2.5.

Polymethacrylic acid may replace some or all of the polyacrylic acid, and this improves flowability, being less viscous, but at the expense of some loss of strength.

Finally, it may be beneficial, especially where the composition is used to form a foundry core by blowing, to use certain known additives in order to improve flowability, such as 1% paraffin (added just before the mixture is transferred from the mixer to the sand blower), or between 0.1% and 1% of linseed oil added at an earlier stage. Another possible additive is 1% of finely divided plumbago or graphite or fly ash, added in the mixer. These percentages are based on the weight of the sand.

I claim:

1. A method of forming a foundry mould or core comprising adding to a body of granular refractory particles a binder consisting essentially of an alkali metal salt of a polyvalent organic acid or of a polymerised monovalent organic acid, together with an alkaline earth metal hydroxide and water, said acid having a pKa of not less than 2.5 and the total weight of the non-organic constituent of the binder comprising between 25 and 400% of the weight of said alkali metal salt, and then passing an acid gas through the resulting body.

2. The method of claim 1 wherein said gas is carbon dioxide.

3. The method of claim 1, wherein said polymerised organic acid is polyacrylic acid.

4. The method of claim 3, wherein said salt is sodium polyacrylate.

5. The method of claim 1 wherein said alkaline earth metal hydroxide is calcium hydroxide.

6. The method of claim 1 wherein said binder is prepared as an aqueous solution before addition of said alkaline earth metal hydroxide, and wherein the pH of said solution, before addition of said alkaline earth metal hydroxide, is not less than 5.7.

7. The method of claim 1 wherein in addition to said alkaline earth metal hydroxide there is present in said binder a finite amount of a polyvalent metal oxide to the extent (by weight) of up to 80% of the total weight of non-organic constituent.

8. The method of claim 7 wherein a salt of a polyvalent metal is present, to an extent up to 10% by weight of said polyvalent metal oxide.

9. The method of claim 1 wherein said alkali metal salt is added to the extent of between 0.2 and 6% of the total weight of the refractory mixture.

10. The method of claim 9 wherein said alkali metal salt is added to the extent of 0.5 to 1.5% of the total weight of the refractory mixture.

11. A foundry mould body formed by the method of claim 1.